US009323519B2

(12) United States Patent  
Faus et al.

(10) Patent No.: US 9,323,519 B2
(45) Date of Patent: Apr. 26, 2016

(54) PACKAGING AN APPLICATION

(75) Inventors: Norman Lee Faus, Holly Springs, NC (US); Darryl L. Pierce, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 1965 days.

(21) Appl. No.: 11/849,255

(22) Filed: Aug. 31, 2007

(65) Prior Publication Data

US 2009/0064086 A1  Mar. 5, 2009

(51) Int. Cl.
*G06F 9/44* (2006.01)
*G06F 9/445* (2006.01)

(52) U.S. Cl.
CPC ... *G06F 8/68* (2013.01); *G06F 8/60* (2013.01)

(58) Field of Classification Search
None
See application file for complete search history.

(56) References Cited

U.S. PATENT DOCUMENTS

| | | | |
|---|---|---|---|
| 5,790,796 A * | 8/1998 | Sadowsky | 709/221 |
| 5,835,777 A * | 11/1998 | Staelin | 717/175 |
| 5,950,010 A * | 9/1999 | Hesse et al. | 717/178 |
| 5,966,540 A * | 10/1999 | Lister | G06F 8/61 717/118 |
| 6,075,938 A * | 6/2000 | Bugnion et al. | 703/27 |
| 6,117,187 A * | 9/2000 | Staelin | 717/169 |
| 6,178,546 B1 * | 1/2001 | McIntyre | 717/115 |
| 6,223,345 B1 * | 4/2001 | Jones et al. | 717/100 |
| 6,353,928 B1 * | 3/2002 | Altberg et al. | 717/175 |
| 6,367,077 B1 | 4/2002 | Brodersen et al. | |
| 6,381,742 B2 * | 4/2002 | Forbes et al. | 717/176 |
| 6,389,589 B1 * | 5/2002 | Mishra et al. | 717/170 |
| 6,405,364 B1 * | 6/2002 | Bowman-Amuah | 717/101 |
| 6,442,754 B1 * | 8/2002 | Curtis | G06F 8/61 707/999.104 |
| 6,535,915 B1 * | 3/2003 | Valys et al. | 709/222 |
| 6,578,199 B1 | 6/2003 | Tsou et al. | |
| 6,662,357 B1 * | 12/2003 | Bowman-Amuah | 717/120 |
| 6,718,535 B1 * | 4/2004 | Underwood | 717/101 |
| 6,973,647 B2 * | 12/2005 | Crudele et al. | 717/177 |
| 6,986,135 B2 * | 1/2006 | Leathers et al. | 717/177 |
| 7,010,780 B2 * | 3/2006 | Perycz et al. | 717/107 |
| 7,194,728 B1 * | 3/2007 | Sirota et al. | 717/106 |
| 7,412,700 B2 * | 8/2008 | Lari | G06F 8/61 707/999.202 |
| 7,461,095 B2 | 12/2008 | Cohen et al. | |
| 7,461,374 B1 * | 12/2008 | Balint | G06F 8/68 717/135 |
| 7,506,335 B1 * | 3/2009 | Wooff | G06F 8/61 717/173 |
| 7,526,534 B2 * | 4/2009 | Henseler | 709/220 |
| 7,624,394 B1 | 11/2009 | Christopher, Jr. | |
| 7,739,608 B2 * | 6/2010 | Fujishita | 715/744 |
| 7,761,900 B2 * | 7/2010 | Crayford | 725/87 |
| 7,770,151 B2 * | 8/2010 | Sanjar et al. | 717/109 |
| 7,827,549 B2 * | 11/2010 | Tarassov | 717/174 |
| 7,873,960 B2 * | 1/2011 | Templin et al. | 717/175 |
| 7,937,455 B2 * | 5/2011 | Saha et al. | 709/220 |
| 8,095,783 B2 * | 1/2012 | Chong et al. | 713/2 |
| 8,117,612 B2 * | 2/2012 | Flegg et al. | 717/178 |
| 8,181,186 B1 * | 5/2012 | Holcomb et al. | 719/310 |
| 8,245,185 B2 * | 8/2012 | Shapiro | G06F 8/61 717/104 |
| 8,255,904 B2 * | 8/2012 | Sheppard | G06F 8/61 717/168 |
| 8,312,115 B2 * | 11/2012 | Lipscombe et al. | 709/222 |
| 8,468,518 B2 * | 6/2013 | Wipfel | G06F 8/61 717/168 |
| 8,522,205 B2 * | 8/2013 | Lari et al. | 717/120 |

(Continued)

*Primary Examiner* — Tuan Q. Dam
*Assistant Examiner* — Zheng Wei
(74) *Attorney, Agent, or Firm* — Lowenstein Sandler LLP

(57) ABSTRACT

An embodiment relates generally to a method of packaging an application. The method includes providing for a plurality of applications and receiving a selection of an application from the plurality of applications. The method also includes determining a set of binary files for a lightweight operating system configured to only support the selected application and packaging the set of binary files with the selected application as an installation package.

16 Claims, 5 Drawing Sheets

(56) References Cited

U.S. PATENT DOCUMENTS

| | | | |
|---|---|---|---|
| 8,640,123 B2 * | 1/2014 | Wookey | G06F 8/68 717/169 |
| 8,661,406 B2 * | 2/2014 | Shapiro | G06F 8/61 713/2 |
| 8,935,658 B2 * | 1/2015 | Shapiro | G06F 8/61 717/106 |
| 2002/0086688 A1 | 7/2002 | Kang | |
| 2002/0129352 A1 | 9/2002 | Brodersen et al. | |
| 2005/0044541 A1 | 2/2005 | Parthasarathy et al. | |
| 2006/0031831 A1 * | 2/2006 | Templin et al. | 717/175 |
| 2007/0074201 A1 | 3/2007 | Lee | |
| 2007/0169079 A1 | 7/2007 | Keller et al. | |
| 2007/0245332 A1 | 10/2007 | Tal et al. | |
| 2008/0022271 A1 | 1/2008 | D'Angelo et al. | |
| 2008/0052384 A1 | 2/2008 | Marl et al. | |
| 2009/0144718 A1 | 6/2009 | Boggs | |
| 2009/0222805 A1 | 9/2009 | Faus | |
| 2009/0222806 A1 | 9/2009 | Faus | |
| 2009/0222808 A1 | 9/2009 | Faus | |
| 2009/0249488 A1 | 10/2009 | Robinson et al. | |
| 2009/0300164 A1 | 12/2009 | Boggs | |
| 2009/0300584 A1 | 12/2009 | Faus | |
| 2009/0300593 A1 | 12/2009 | Faus | |
| 2009/0300601 A1 | 12/2009 | Faus | |

* cited by examiner

PACKAGING AN APPLICATION

BACKGROUND OF THE INVENTION

1. Field

This invention relates generally to applications, more particularly, to systems and methods for packaging an application with a lightweight operating system.

2. Description of the Related Art

An operating system is the software that manages the sharing of the resource of a computer. The operating system processes raw system data and user input, and responds by allocating and managing tasks and internal system resources as a service to users and programs of the system. At the foundation of all system software, an operating system performs basic tasks such as controlling and allocating memory, prioritizing system requests, controlling input and output devices, facilitating networking and managing file systems.

As operating systems continue to develop and progress, the file size of operating systems grow larger and larger as additional features and services are incorporated into the operating systems. This is a phenomena known as "feature creep" as the operating system tries to be all things for all users. As such, the operating systems can contain many files or programs that may not applicable to a certain class of user. For example, a server at a law firm may not have a need for the associated files for real time operation or network application development. The non-essential features of the operating system can take up storage resources and processing bandwidth.

Accordingly, there is a need in the art for a mechanism to provide for a lightweight operating system specifically tailored for a selected application to reduce storage requirements and maximize computing resources.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems and methods for a lightweight version of an operating system to package with virtual images of software applications. More particularly, an application service can be configured to receive a selected application from a user as well as configuration information regarding the computer system of the user. The application service can then determine a set of binary files that define a lightweight version of the operating system configured to only support the selected application. In some embodiments, the application service can check the dependencies of the selected application to determine the necessary files from a full version of the operating system as well as any utilities, prerequisite applications and/or libraries, i.e., dependent objects.

The application service can then package the binary files, a virtual image of the application, and the configuration information as an installation package. The user can then install the installation package to implement the selected application. Accordingly, a computing device can be installed with the minimal amount of operating systems, prerequisite software, and/or utilities to implement a particular application. With the lightweight version of the operating system, there can be an increase in efficiency, a reduction in system administration tasks, and an increase in throughput.

Figure 1:
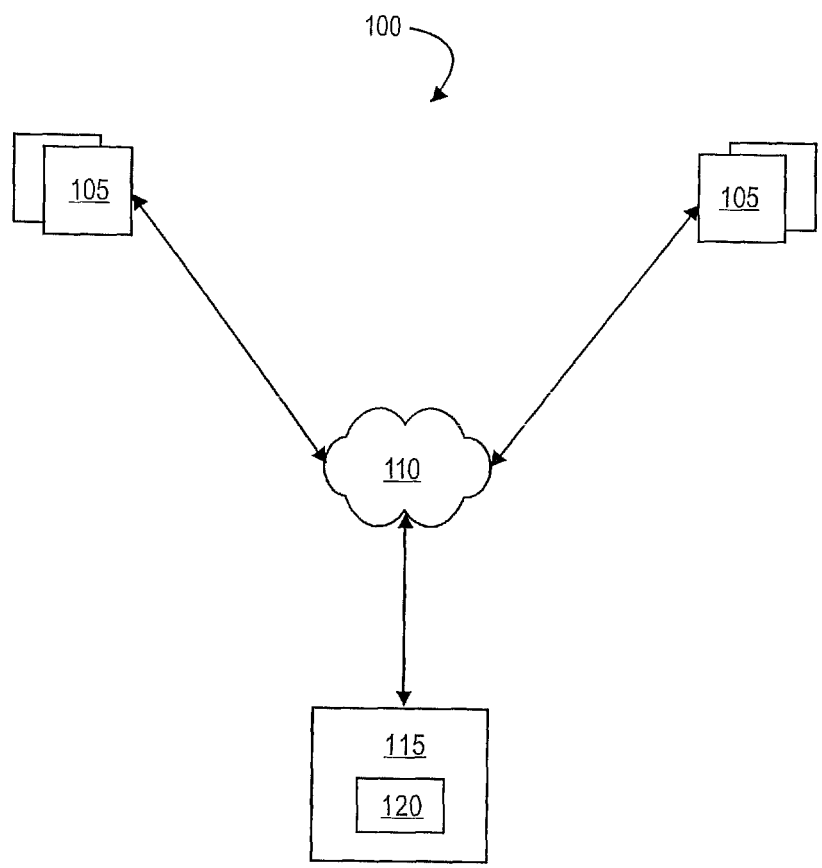
FIG. 1 depicts an exemplary system in accordance with an embodiment.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes users 105, a network 110 and a service portal 115. The users 105 can be private individuals, employees of private business or public entities or other persons interested in accessing the service portal 115. The users 105 can access the service portal 115 using personal computers, personal mobile devices, workstations or other networked computing platforms.

The network 110 can be a combination of wide area and local area networks such as the Internet. The network 110 can be configured to provide a communication channel between the users 105 and the service portal 115. The network 110 can implement a variety of network protocols to provide the communication channel such as Internet Protocol ("IP") Vx, ATM, SONET, or other similar network protocols.

The service portal 115 can be configured to provide products and services to the user 105 as well as provisioning, installation services, updates to software and hardware products and technical support. The service portal 115 can, among other functions, provide a list of products such as software applications and/or hardware devices as well as services such as installation, configuration, maintenance, etc., for users to purchase. As a non-limiting example, the service portal 115 can also provide information for users to research, compare and purchase software, hardware and consulting services in support of those software and/or hardware purchases. The service portal 115 can also be configured to provide support services by subscription to those same software, service, and/or hardware purchases.

In accordance with various embodiments, the service portal 115 can be configured to provide an application service 120, which can be configured to receive a selected application from a user as well as configuration information regarding the computer system of the user. The application service 120 can then determine a set of binary files that define a lightweight version of the operating system, or minimally optimized, configured to only support the selected application.

The application service 120 can then check the dependencies of the selected application to determine the necessary files, utilities, applications, and/or libraries from a full version of the operating system as well as any utilities, prerequisite applications and/or libraries, i.e., dependent objects.

Subsequently, the application service 120 can package the binary files, a virtual image of the application, and the configuration information as an installation package. The user can then install the installation package to implement the selected application. Accordingly, a computing device can be installed with the minimal version of the operating system, prerequisite software, and/or utilities to implement a particular application. With the lightweight version of the operating system, there can be an increase in efficiency, a reduction in system administration tasks, and an increase in throughput.

Figure 2:
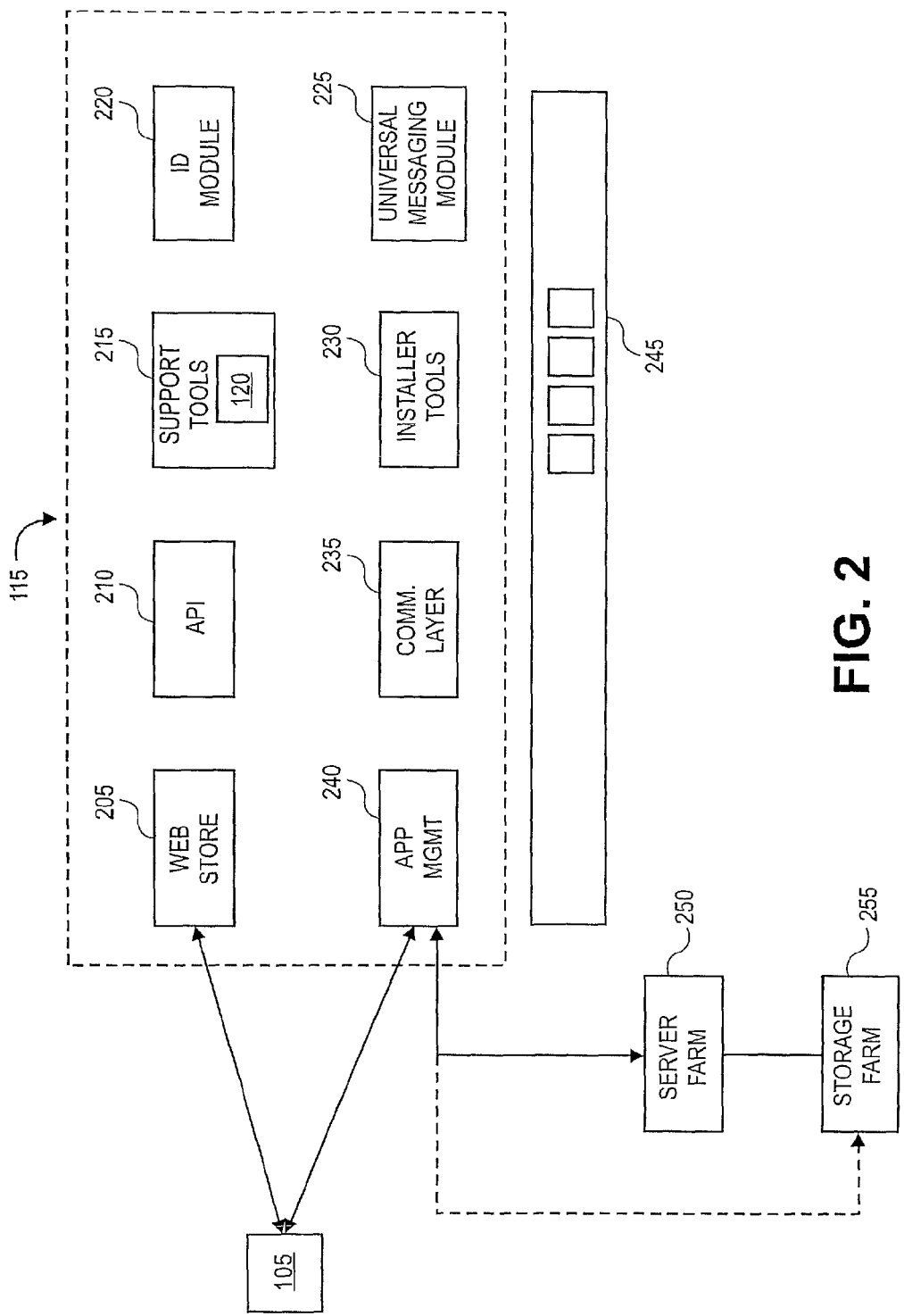
FIG. 2 illustrates an exemplary service portal of the system shown in FIG. 1 in accordance with another embodiment.

FIG. 2 illustrates a more detailed block diagram of the service portal 115 in accordance with another embodiment. It should be readily apparent to those of ordinary skill in the art that the service portal 115 depicted in FIG. 2 represents a generalized schematic illustration and that other components may be added or existing components may be removed or modified.

As shown in FIG. 2, the service portal 115 can include a web store module 205 that a user can interface with the service portal. The web store module 205 can provide the graphical user interfaces ("GUIs", e.g., a web page) and associated functions and/or services for the service portal 115. As a non-limiting example, the web store module 205 can generate a log-in GUI for a user to authenticate and enter the service portal 115.

The web store module 205 can couple with an application program interface ("API") module 210. The API module 210 can be configured to provide an interface between the functions and/or services provided by the web store module 205 and to the appropriate module of the service portal 115. More particularly, the API module 210 can call or direct a requested function or service from the user to the respective module that provides that requested function or service. For example, a user may request a price of a product, e.g., an electronic mail program, the API module 210 can direct the request to a get price function in a support tools module 215.

The API module 210 can also be configured to interface with the support tools module 215. The support tools module 215 can be configured to provide the supporting software and hardware to implement the functionality of the service portal 115. The support tools module 215 can contain and provide access to databases that contain information such as product lines, services providers, on-line self-help (e.g., knowledge library), etc. The support tools module 215 can also provide services like a chat service, a help desk, installation, provisioning, etc.

The API module 210 can be further configured to couple with an identification ("ID") module 220. The ID module 220 can be configured to provide identification management services for the service portal 115. The ID module 220 can also store information related to users such as purchase history, user profile, usage history of the user, and entitlement data.

The API module 210 can be further configured to couple with a universal messaging module 225. The universal messaging module 225 can be configured to provide a messaging application that unifies messages. More specifically, electronic mail ("email"), documents, and instant messaging can be linked in a single application. The universal messaging module 225 can also provide a mechanism for a user to view all the related documents for the user from email to Wiki pages.

An installer tools 230 can be coupled to the API module 210. One of the services provided by the service portal 115 can be the vending of software applications provided by independent software vendors ("ISVs"). As part of the delivery of the software applications, the ISV can be required to maintain and update the installation tools to install their respective software applications. Accordingly, the installer tools 230 can be a repository where independent software vendors can deposit their respective installation tools.

The API module 210 can be further coupled to the communication layer 235 (labeled as COMM layer in FIG. 2). The communication layer 235 can be configured to provide the underlying services for the modules of the service portal 115 to communicate. For example, the communication layer 235 can contain middleware for a product database to communicate with a graphical user interface, e.g., a web page, requesting product description.

The API module 210 can be further coupled to an application management module 240 (labeled as APP MGMT in FIG. 2). The application management module 240 can be configured to manage applications as requested by users. More specifically, a user may purchase a prepackaged software application pack (e.g., an operating system, electronic mail program and data mining program as a single package) from the service portal 115, which is stored in an application stack module 245. The application management module 240 can then deliver the purchased software application stack, install and configure the software application stack at a third party site such as a server farm 250 or store the software application stack in a storage farm 255 for the user to retrieve.

The server farm 250 can be configured to provide computing platforms for users to lease. Accordingly, users can have a "hot" backup version of their systems, a testing platform to perform quality assurance tests on new applications, execute a program requiring excess MIPS, or any other similar computing task.

The storage farm 255 can be configured to provide storage space for users to lease. Accordingly, users can lease disk storage space to back up data, provide a hot data swap, or other storage intensive tasks.

In some embodiments, the application service 120 can be configured to be executed in the support tools module 215. In other embodiments, the application service 120 can be a module of the web store module 205. In yet other embodiments, the application service 120 can be executed as a standalone module.

Figure 3:
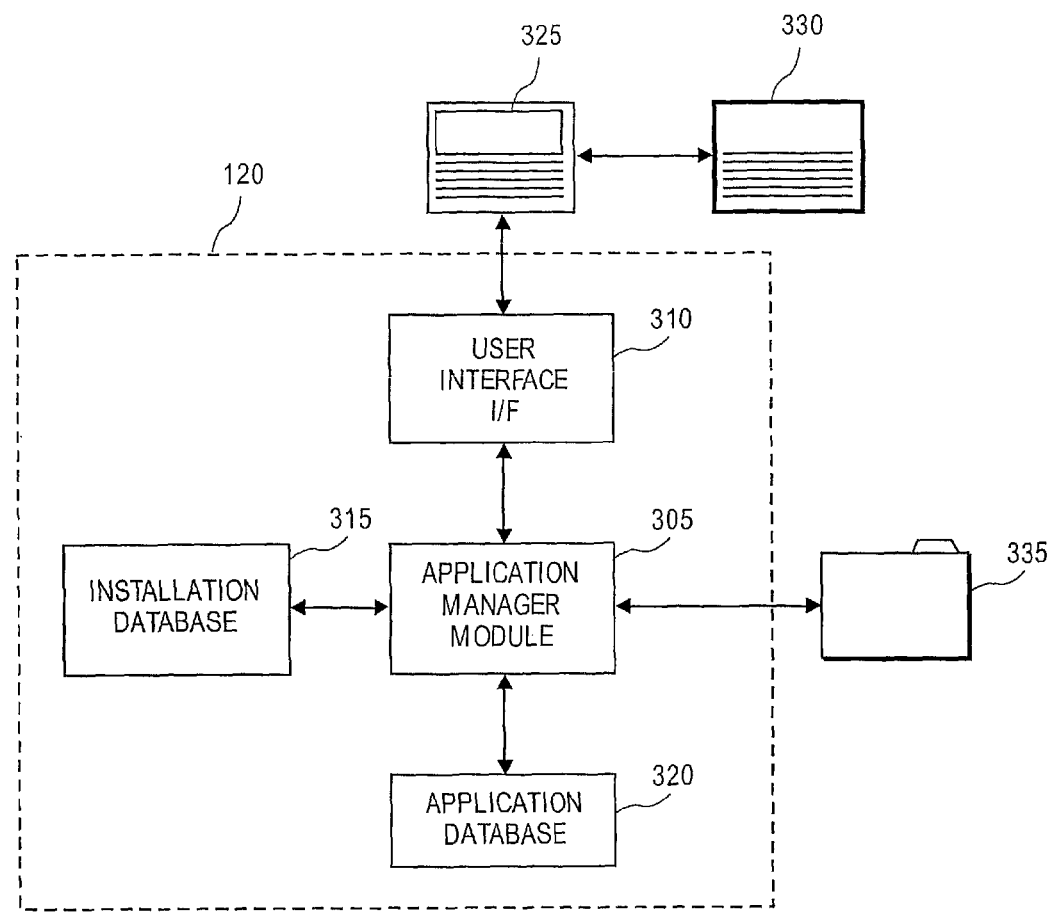
FIG. 3 depicts an exemplary block diagram of the application service shown in FIG. 1 in accordance with yet another embodiment.

FIG. 3 depicts a more detailed block diagram of the application service 120 in accordance with another embodiment. It should be readily apparent to those of ordinary skill in the art that the application service 120 depicted in FIG. 3 represents a generalized schematic illustration and that other components may be added or existing components may be removed or modified.

As shown in FIG. 3, the application service 120 can comprise an application manager module 305, a user interface module 310, an installation database 315, and an application database 320. It should be readily obvious to one of ordinary skill in the art that the depicted modules 305-320 can be implemented as software applications (programmed in C, C++, JAVA, PHP, etc.), hardware components (EEPROM, application specific integrated circuit, microprocessor, etc.) or combinations thereof.

The application manager module 305 can be configured to manage and to interface with the other modules 310-320 to provide the functionality of the application service 120 as described above and further described herein below.

The user interface module 310 can be configured to generate and interface with graphical user interfaces ("GUIs", e.g., web page) as required by the application manager module 305. For example, the user interface module 310 can generate an application browse web page 325. The application browse page 325 can display a list of applications that are supported by and can be purchased on the service portal 115. The application browse page 325 can also provide selection widget to allow a user to select an application for purchase. When the application browse page 325 is submitted for purchase, the name of the selected application can be forwarded to the application manager module 305.

In some embodiments, the application browse page 325 can be linked to a user configuration data web page 330. The user configuration data web page 330 can request the user to implement the configuration data related to the computer system where the selected application is to be installed. The configuration data or information can include processor type, file system, size of memory, Internet Protocol ("IP") address, firewall configuration, number of users, security information, etc. The user configuration data web page 330 can then forward the user configuration data to the application manager module 305 when the user activates a submit widget on the user configuration data web page 330.

The web pages 325, 330 can be implemented with hypertext markup language ("HTML"), Extensible Markup Lange ("XML"), Cascading Style Sheets ("CSS") or other semantic and non-semantic markup languages. It should be readily obvious to one of ordinary skill in the art that the web pages 325, 330 can be implemented in a variety of ways depending on the requirements of the users of the service portal 115.

In some embodiments, the user interface module 310 can be considered an application program interface module which provides the necessary tools and interfaces to communicate with other modules of the application service 120 and the other modules of the service portal 115 as previously described and described in greater detail herein below.

The application manager module 120 can also be coupled with the installation database 315. The installation database 315 can be configured to store recipes for the multiple applications. Each recipe can be associated with an application. The recipe can contain information such as any dependencies in the operating system, prerequisite applications, i.e., any application that needs to be installed so the selected application can operate correctly, utilities, libraries, miscellaneous files, etc., which can be defined as dependent objects. The recipes can be derived from existing dependency databases such as an RPM database, Windows Registry, etc. The installation database 315 can then return the name of each dependent object to the application manager module 305 as a dependent object list.

Accordingly, the dependent object list can then specify a lightweight operating system and associated files, utilities, libraries, and/or prerequisite applications to execute the selected application. For example, if the selected program was an electronic mail server, the dependent object list would not include print drivers for the operating system since clients of the electronic mail server are expected to print at their remote locations. A law firm user can exclude the sections of the operating system that support real-time operations as another example. The application service 120 is configured to provide the minimal application stack, i.e., from the operating system to the selected application, that provides the maximum performance only for the selected application.

The application manager module 305 can be further coupled to the application database 320. The application database 320 can contain the binary files of the supported applications provided by the service portal 115. The supported applications can range from operating systems (e.g., Linux, Windows™, Unix, etc.), software applications (e.g., electronic mail programs, spreadsheet programs, customer relationship management software, etc.), libraries, and/or utilities (e.g., FTP, drivers, etc.). The applications manager module 305 can be configured to retrieve each binary file listed on the dependent object list from the application database 320. The application manager module 305 can then package the retrieved binary files, which contain a minimal application stack, along with an associated dependent objects as a virtual image for the installation package 335 with the configuration information. Accordingly, the user can install the installation package 335 at the site of the user.

In some embodiments, the application database 320 can be part of the application stack 245. As such, the application manager module 305 can then be configured with an interface to the application stack 245 to retrieve the binary files.

Figure 4:
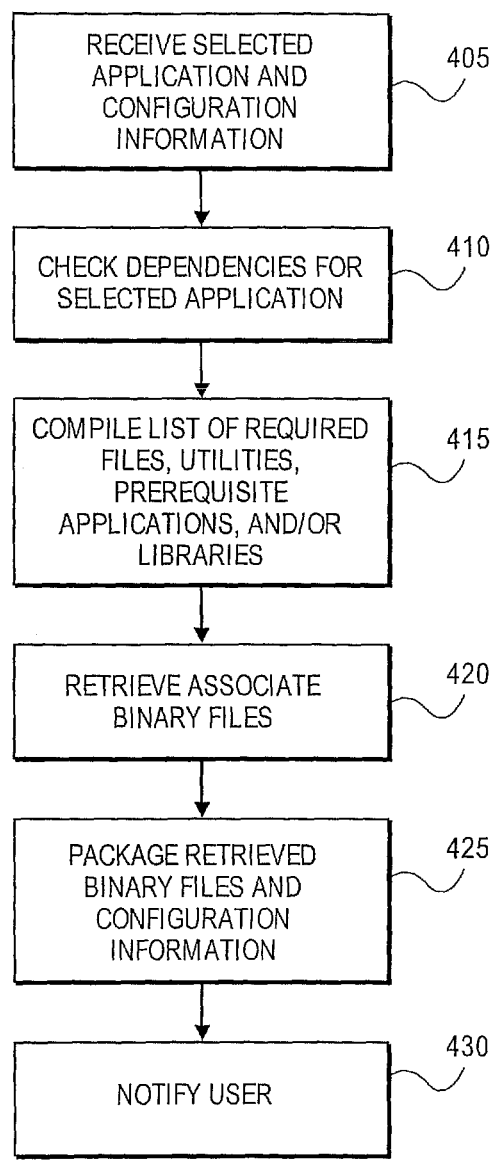
FIG. 4 illustrates an exemplary flow diagram in accordance with yet another embodiment.

FIG. 4 illustrates an exemplary flow diagram 400 in accordance with yet another embodiment. It should be readily apparent to those of ordinary skill in the art that the flow diagram 400 depicted in FIG. 4 represents a generalized schematic illustration and that other steps may be added or existing steps may be removed or modified.

As shown in FIG. 4, the application manager module 305 can be configured to receive a selection of a software application and user configuration information, in step 405. More specifically, a user may have selected an application from the application browse page 325 and application manager module 305 can retrieve the user configuration information from the user configuration data web page 330. The selected application and user configuration information can be temporarily buffered by the application manager module 305.

In step 410, the application manager module 305 can be configured to query the installation database 315 for the dependencies of the selected software application. In step 415, the installation database 315 can be configured to compile a dependent object list that contains the name of the required files (including those of the operating system), utilities, prerequisite software applications, and/or libraries. The installation database 315 can forward the dependent object list to the application manager module 305.

In step 420, the application manager module 305 can be configured to retrieve an associated binary file(s) for each listed dependent object on the dependent object list from the application database 320. The application manager module 305 can temporarily buffer each retrieved dependent object.

In step 425, the application manager module 305 can be configured to package the retrieved dependent object(s) as a virtual image and the user configuration information as an installation package for the requesting user to install. In step 430, the application manager module 305 can notify the user when the installation package is completed. As an example, the application manager module 305 can transmit an electronic mail message containing a link to the installation package 335 for a user to retrieve at a later date.

Figure 5:
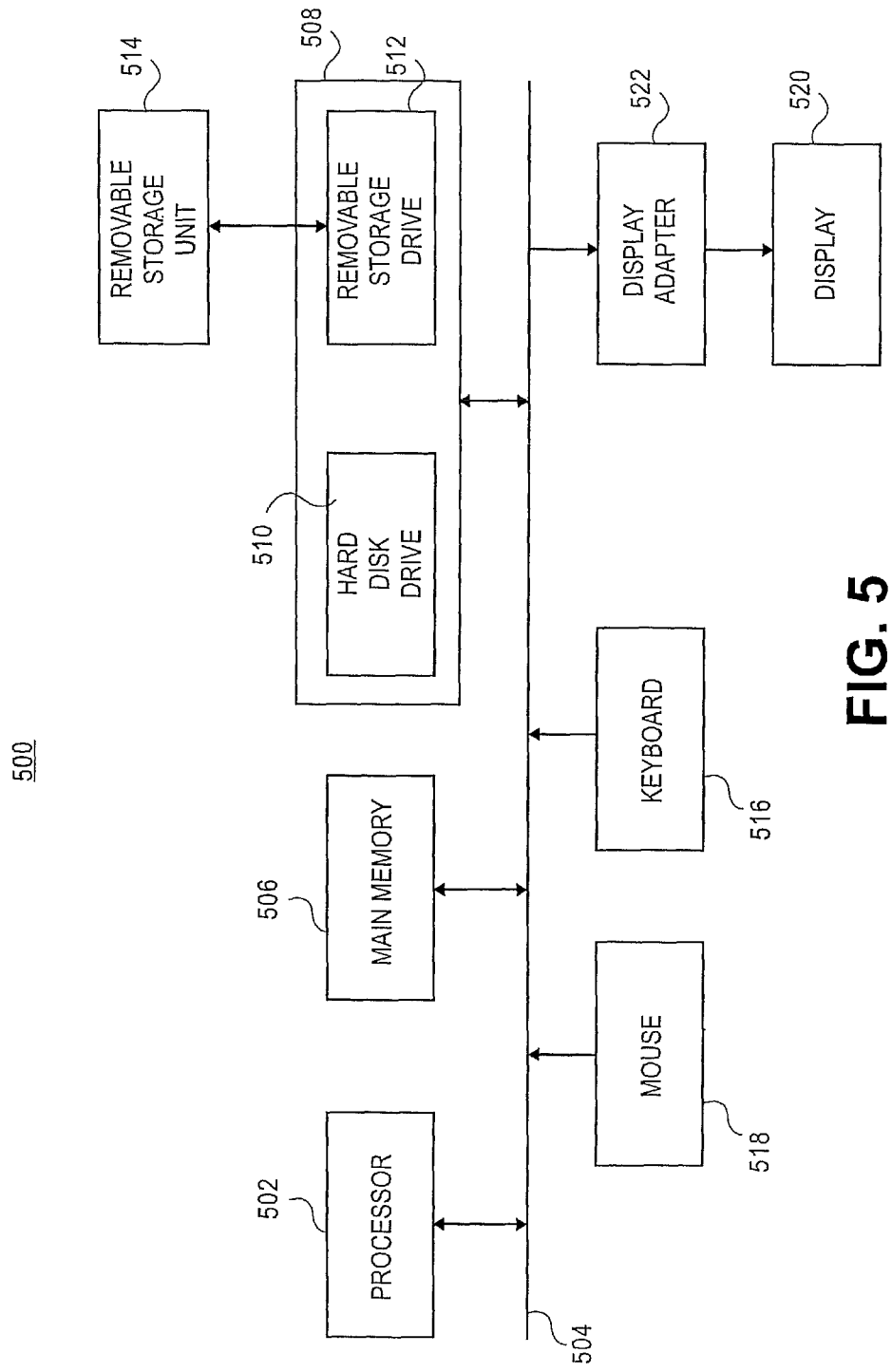
FIG. 5 depicts an exemplary computing platform in accordance with yet another embodiment.

FIG. 5 illustrates an exemplary block diagram of a computing system 500 where an embodiment may be practiced. The functions of the application service 120 may be implemented in program code and executed by the computing platform 500. The application service 120 may be implemented in computer languages such as PASCAL, C, C++, JAVA, etc.

As shown in FIG. 5, the computer system 500 includes one or more processors, such as processor 502 that provide an execution platform for computer program embodiments of the application service 120. Commands and data from the processor 502 are communicated over a communication bus 504. The computer system 500 also includes a main memory 506, such as a Random Access Memory (RAM), where the application service 120 may be executed during runtime, and a secondary memory 508. The secondary memory 508 includes, for example, a hard disk drive 510 and/or a removable storage drive 512, representing a floppy diskette drive, a magnetic tape drive, a compact disk drive, etc., where a copy of a computer program embodiment for the application service 120 may be stored. The removable storage drive 512 reads from and/or writes to a removable storage unit 514 in a well-known manner. A user interfaces with the application service 120 with a keyboard 516, a mouse 518, and a display 520. The display adapter 522 interfaces with the communication bus 504 and the display 520. A display adapter 522 also receives display data from the processor 502 and converts the display data into display commands for the display 520.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
receiving an indication of a selected application from a plurality of applications and a set of configuration information defining components of a computer system where the selected application is to be installed;
determining a plurality of dependencies of the selected application on a plurality of individual binary files of a full operating system, wherein the individual binary files are utilized by the selected application;
generating a dependent object list comprising the plurality of individual binary files;
determining, by a processor, a lightweight operating system comprising a set of binary files from the full operating system to only support the selected application, the determined set of binary files for the lightweight operating system including only the plurality of individual binary files from the dependent object list;
packaging the determined set of binary files with the selected application as a virtual image and the set of configuration information as an installation package; and
providing the installation package to the computer system, the installation package to install the selected application on the computer system.

2. The method of claim 1, wherein the at least one dependency comprises one of a utility application, a prerequisite application, and a library.

3. The method of claim 2, wherein packaging the set of binary files includes at least one of the utility application, the prerequisite application, and library in response to the selected application having the at least one dependency.

4. The method of claim 3, further comprising installing the installation package on the computer system.

5. An apparatus comprising:
a memory to store an installation database to maintain files that are changed and created during installation; and
a processor, operatively coupled to the memory, the processor to receive an indication of a selected application from a plurality of applications and a set of configuration information defining components of a computer system where the selected application is to be installed, to determine a plurality of dependencies of the selected application on a plurality of individual binary files of a full operating system, wherein the individual binary files are utilized by the selected application; to generate a dependent object list comprising the plurality of individual binary files; to determine a minimized operating system comprising a set of binary files from the full operating system to only support the selected application, the determined set of binary files for the minimized operating system including only the plurality of individual binary files from the dependent object list by querying the installation database; to package the determined set of binary files with the selected application as a virtual image and the set of configuration information as an installation package; and to provide the installation package to the computer system, the installation package to install the selected application on the computer system.

6. The apparatus of claim 5, the processor further to generate a graphical user interface for a user to select the application and to input the configuration information.

7. The apparatus of claim 5, wherein the processor further to check the at least one dependency for the selected application by querying the installation database.

8. The apparatus of claim 7, wherein the at least one dependency comprises one of a utility application, a prerequisite application, and a library.

9. The apparatus of claim 8, the processor further to package the set of binary files to include at least one of the utility application, the prerequisite application, and library in response to the selected application having the at least one dependency.

10. The apparatus of claim 9, wherein the processor further to forward the installation package to the computer system.

11. A system comprising:
a memory to store a service portal to be accessible to a plurality of users over a network and to provide a plurality of applications for purchase; and
a processor operatively coupled to the memory, the processor to:
execute an application service, to execute on the service portal for the user, wherein the application service to provide, in a user interface, an application browse web page and a user configuration data web page, the application browse web page to receive an indication of a selected application from the plurality of applications and the user configuration data web page to receive a set of configuration information defining components of a computer system where the selected application is to be installed;
determine a plurality of dependencies of the selected application on a plurality of individual binary files of a full operating system, wherein the individual binary file is utilized by the selected application;
generate a dependent object list comprising the plurality of individual binary files;
determine a minimized operating system comprising a set of binary files from the full operating system to only support the selected application, the determined set of binary files for the minimized operating system including only the plurality of individual binary files from the dependent object list, wherein the minimized operating system to only support the selected application;
to package the determined set of binary files with the selected application as a virtual image and the set of configuration information as an installation package; and
provide the installation package to the computer system, the installation package to install the selected application on the computer system.

12. The system of claim 11, wherein the application service is to generate a graphical user interface for a user to select the application and to input the configuration information.

13. The system of claim 11, further comprises an installation database to maintain files that are changed and created during installation.

14. The system of claim 13, wherein the at least one dependency comprises one of a utility application, a prerequisite application, and a library.

15. The system of claim 14, wherein the application service is to package the set of binary files to include at least one of the utility application, the prerequisite application, and library in response to the selected application having the at least one dependency.

16. The system of claim 15, wherein the application service is to forward the installation package to the computer system.

* * * * *